United States Patent [19]

Nakasaki

[11] Patent Number: 5,015,315
[45] Date of Patent: May 14, 1991

[54] METHOD OF MAKING A PNEUMATIC TIRE
[75] Inventor: Eiji Nakasaki, Kakogawa, Japan
[73] Assignee: Sumitomo Rubber Industries, Ltd., Hyogo, Japan
[21] Appl. No.: 315,117
[22] Filed: Feb. 24, 1989
[30] Foreign Application Priority Data Feb. 27, 1988 [JP] Japan .................................. 63-44943

[51] Int. Cl.$^5$ ............................................. B29D 30/06
[52] U.S. Cl. .................................. 156/130.7; 152/452; 156/123; 156/125; 264/326
[58] Field of Search ............... 156/123, 125, 126, 127, 156/128.1, 130, 130.3, 130.7, 134, 157, 304.1, 304.3, 245, 304.5, 502; 152/452; 264/326; 474/254, 256, 257

[56] References Cited

U.S. PATENT DOCUMENTS

| | | | |
|---|---|---|---|
| 2,497,226 | 2/1950 | McNeill | 264/326 X |
| 2,686,554 | 8/1954 | Hinman | 264/326 X |
| 3,472,715 | 10/1969 | Weinbrenner et al. | 156/125 |
| 3,860,052 | 1/1975 | Schroeder | 152/452 X |
| 4,140,165 | 2/1979 | Lapeyre | 156/123 X |
| 4,313,482 | 2/1982 | Vente et al. | 152/452 X |
| 4,315,536 | 2/1982 | Knipp et al. | 152/452 |
| 4,737,213 | 4/1988 | Daeglis et al. | 156/157 |

FOREIGN PATENT DOCUMENTS 2651033 5/1978 Fed. Rep. of Germany ...... 152/452

Primary Examiner—Michael W. Ball
Assistant Examiner—Geoffrey L. Knable
Attorney, Agent, or Firm—Birch, Stewart, Kolasch & Birch

[57] ABSTRACT

There is disclosed a method for making a pneumatic tire comprising providing a pair of circular half body members including the pair of circular half body members with each other by welding their tread base portions to form a tire main body, applying a tread main body including an uncured breaker and an uncured tread to the outer periphery of the tire main body to form a row cover tire; and to vulcanize the row cover tire in a mold to weld the tread main body and the tire main body by the heat at the vulcanization and to form tread grooves.

2 Claims, 6 Drawing Sheets

METHOD OF MAKING A PNEUMATIC TIRE

Background of the Invention

The present invention relates to a pneumatic tire having a main body made of a high polymer and a method of making a pneumatic tire.

In general, radial ply tires and bias ply tires have been widely used as pneumatic tires. These kinds of tires have been made through many well known processes For example, to explain generally a conventional method of making a radial tire, a typical method comprises at least the following process steps:

making a cord fabric from reinforcing cords,
  applying an adhesive agent to the cord fabric,
  coating the adhesive cord fabric with rubber to make a sheet of rubber coated cords,
  cutting the rubber coated cords on the bias or radial to make a carcass ply,
  applying the carcass ply on a cover-making drum of a tire former,
  disposing bead cores on the carcass ply, and
  folding the edges of the carcass ply around the bead cores.

This cylindrical assembly is then inflated into a shape being approximate to that of the finished tire while holding it between a pair of bead rings of a tire former and decreasing the distance between them to make a carcass of a toroidal shape.

Sidewalls, a breaker, a tread and the like are applied on the inflated toroidal carcass to make a row cover tire, and further vulcanizing the row cover tire in a mold to vulcanize the row rubber and to mold a tread pattern on the tread.

That is, a pneumatic tire, as a whole, made of rubber compound, requires many process steps to make it. On the other hand, an increase in the number of manufacturing process steps is apt to lower the dimensional precision which effects the rotational balance of the tire. Accordingly, when such conventional pneumatic tires are manufactured by such a conventional method special effort to maintain the dimensional precision of the tire is necessary.

In order to solve such problems, it has been proposed to form the whole or part of tire from a high polymer in a molding process.

For example, in Japanese patent application No. 62-215881 by the present applicant, a pneumatic tire is proposed comprising a tire main body formed by moulding a high polymer, and a thread formed from a rubber compound, disposed on the periphery of the tire main body. The tire main body and the cured tread are joined by using an adhesive agent. The adhesive force between the high polymer and the cured rubber is, however, not strong enough to withstand severe service conditions of the tire, and there develops the problem such that the tread is often separated from the tire main body.

SUMMARY OF THE INVENTION

An object of the present invention is, therefore, to provide a pneumatic tire which comprises a tire main body made of high polymer and a tread main body united to the tire main body by a vulcanizing process in a mold, and which can run safely without tread separation even when used under severe service conditions.

Further, another object of the present invention is to provide a method of making the above-mentioned pneumatic tire, by which the tire main body is made easily and precisely, and by which the tire main body and the tread main body are united strongly so as not to separate when the tire is used under severe service conditions.

According to one aspect of the present invention, a pneumatic tire comprises a tire main body and a tread main body disposed therearound. The tire main body is composed of a pair of circular half body members made of a high polymer, each half body being disposed on each side of a tire equator. The pair of circular half body members have sectional shapes substantially symmetrical with each other with respect to the tire equator. Each circular half body member comprises a bead portion, a sidewall portion extending radially outwardly from the bead portion, and a tread base portion extending axially inwardly from the sidewall portion. The tread base portion of one of the circular half body members is connected to the tread base portion of the other circular half body member to form a tread base from the connected tread base portions. The tread main body, including a tread and a breaker, are disposed around the tread base. The tire has a boundary between the tread main body and the tire main body at which the tread main body and the tire main body are fused by heat.

Further, according to another aspect of the present invention, a method of manufacturing the pneumatic tire of the present invention is disclosed. In accordance with this method a pair of circular half body members are formed comprising a bead portion, a sidewall portion extending radially outwardly from the bead portion and a tread base portion extending axially inwardly from the sidewall portion.

The pair of circular half body members are connected to each other by welding their tread base portions to form a tire main body.

A tread main body, including an uncured breaker and an uncured tread, is applied to the outer periphery of the tire main body to form a row, uncured cover tire.

The cover tire is vulcanized in a mold to weld the tread main body and the tire main body by the vulcanization heat and to form tread grooves.

BRIEF DESCRIPTION OF THE DRAWINGS

Embodiments of the present invention will now be described in detail by way of example only in conjunction with the accompanying drawings, in which.

DETAILED DISCUSSION

First of all, a pneumatic tire which embodies the present invention will now be described in detail in conjunction with the drawings.

Figure 1:
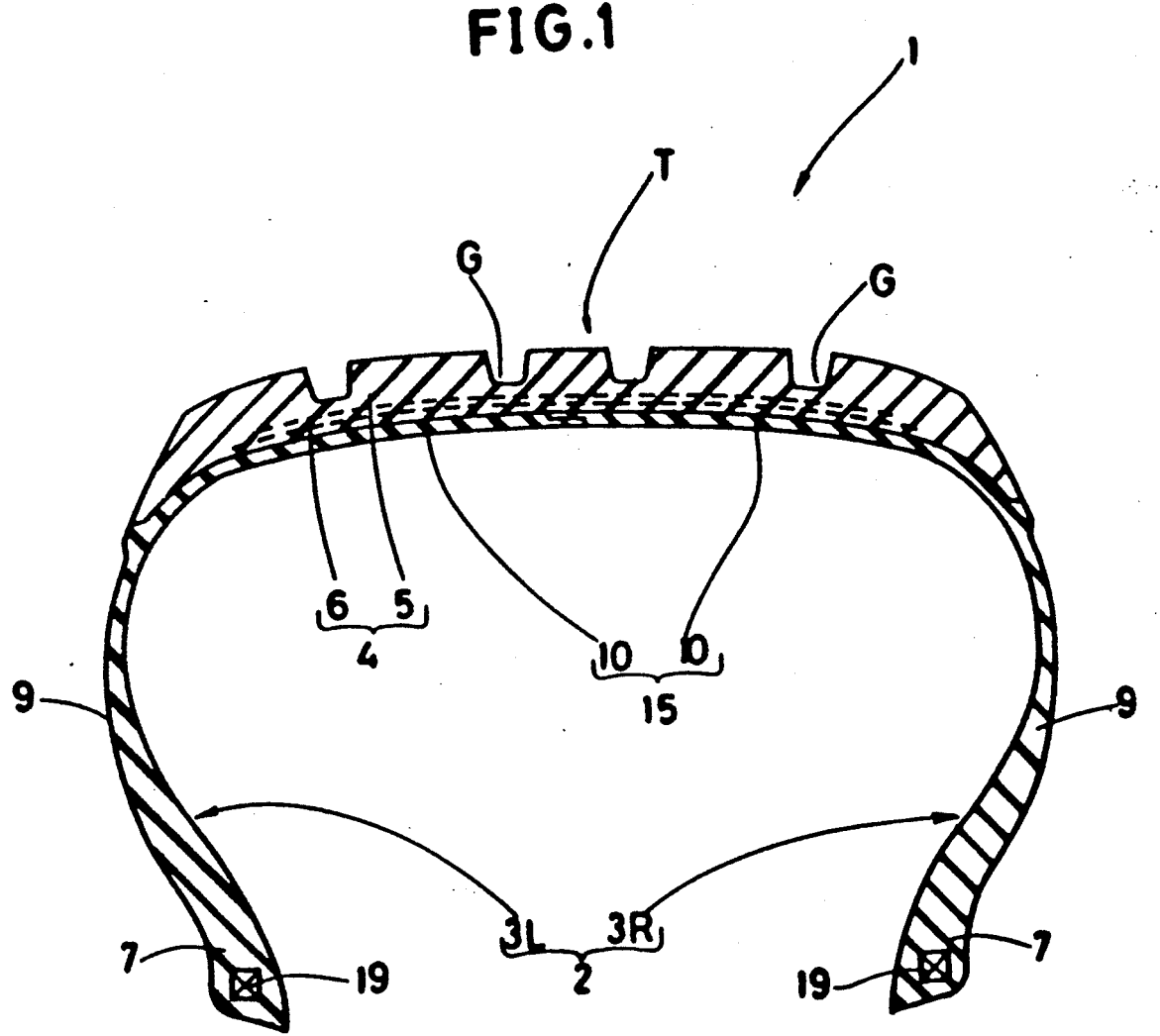
FIG. 1 is a sectional view showing a pneumatic tire according to the present invention.

In FIG. 1, the tire 1 comprises a tire main body 2 made of a high polymer and a tread main body 4, united to the tire main body 2 through a vulcanizing process in a mold, wherein the tire main body 2 is composed of a pair of circular half body members 3L and 3R jointed to each other, and the tread main body 4 includes a breaker 6 and a tread 5, the latter arranged radially outside of the breaker.

The circular half body members have shapes formed by dividing a conventional pneumatic tire at the tire equator into two pieces, that is, a shape like a shallow bowl but having a large circular hole in its center to be mounted on a wheel rim. Therefore, each circular half body member comprises a bead 7, a sidewall 9 extending radially outwardly from the bead 7, and further a tread base 10 extending axially inwardly from the radially outer edge of the sidewall for making up the base part of the tread portion T of the tires. The bead 7 of each circular half body member is provided with a bead core 19 composed of inextensible cords, for example steel wires, similarly to the conventional tire beads.

The cross sectional shapes of the circular half body members 3L and 3R can be selected in accordance with tire size, vehicle type, usage and so on, while FIG. 1 represents a low aspect passenger car tire.

A full detail of the circular half body members 3L and 3R will be given in a description of the tire making method made hereinafter.

The circular half body members 3L and 3R are connected as one body in such way that the axially inner edge portions of the tread bases are overlapped one upon the other in the radial direction of the tire and joined with each other at the tire equator, whereby a tread base 15 corresponding to the carcass crown portion of a conventional tire is formed by the jointed tread bases.

The high polymer used for the circular half body members of this invention is selected from polyester elastomers, but other kinds of high polymers can be employed so long as they are thermoplastic and the article molded therefrom has pull resistance enough to support the inner air pressure, appropriate rubber-like elasticity, and weather resistance.

The above-mentioned tread 5 is disposed around the periphery of the tread base 15, and the breaker 6 is arranged between them.

The breaker 6 comprises at least one ply of rubber coated cords. For these breaker cords, low elongation metallic cords such as steel cords or low elongation organic cords such as kevlar cords, rayon cords and the like are used. The ply number and the cord arrangement angle in each ply are selected in accordance with required tire characteristics. For example, in the case of a two ply construction, as shown in FIG. 1, the cords of one ply are arranged in an inclined direction with respect to the equator, and the cords of the other ply are arranged in the opposite direction with respect to the equator. In the case of three plies, the plies are arranged so as to form a rigid triangular arrangement. In the case of four plies, the radially inner three plies are aranged so as to form a rigid triangular arrangement, and the outermost ply is arranged at a small inclined angle with respect to the tire equator so that the cords are laid substantially parallel to the circumferential direction of the tire.

The above-mentioned thread 5 is made of a rubber compound, and provided on the surface with grooves G to form a tread pattern. The tread 5 makes up the tread main body 4 together with the breaker 6 embedded in the tread by the vulcanizing process in the mold, as shown in FIG. 1. Furthermore, to unite the tread main body 4 and the tire main body 2 into one body, the boundary therebetween is melted by heat and fused by the pressure during vulcanizing process in the mold, that is, the tread main body and the tire main body are welded into one body.

To use the pneumatic tire 1, it is mounted on a wheel rim like a conventional pneumatic tire.

As explained above, the pneumatic tire 1 has a main body composed of the united circular half body members made of a high polymer. Accordingly, it has such an advantage that the precision in tire dimension is improved to enhance the tire rotational balance, and to decrease the tire weight. Further, the tire 1 has the breaker 6 beneath the tread. Accordingly, the cut resistance, the wear resistance and the puncture resistance can be improved. Furthermore, because the tire has a rubber tread, the tire can be provided with a good road grip performance. Still furthermore, the tire main body and the tread main body are united, to each other in one body by heat and pressure at vulcanization. Therefore, the resultant bonding strength is remarkably improved, and the tread separation failure is effectively prevented.

Next, according to the present invention, a method of making the above-mentioned pneumatic tire will be explained.

The tire manufacturing method includes:
(a) forming the circular half body members 3L and 3R by molding,
(b) connecting the circular half body members to each other to form the tire main body 2,
(c) applying an uncured breaker 6 and an uncured tread 5 on the tire main body 2 to form a raw, uncured cover tire, and
(d) vulcanizing the resulting tire.

In the process step (a), a pair of circular bead cores 19 are set in a mold, and then a high polymer is injected into the mold to harden, and the hardened high polymer, that is, the circular half body member, is removed from the mold. For the molding method adopted in the process step (a), an injection molding or a vacuum forming and the like can be utilized.

Figure 2:
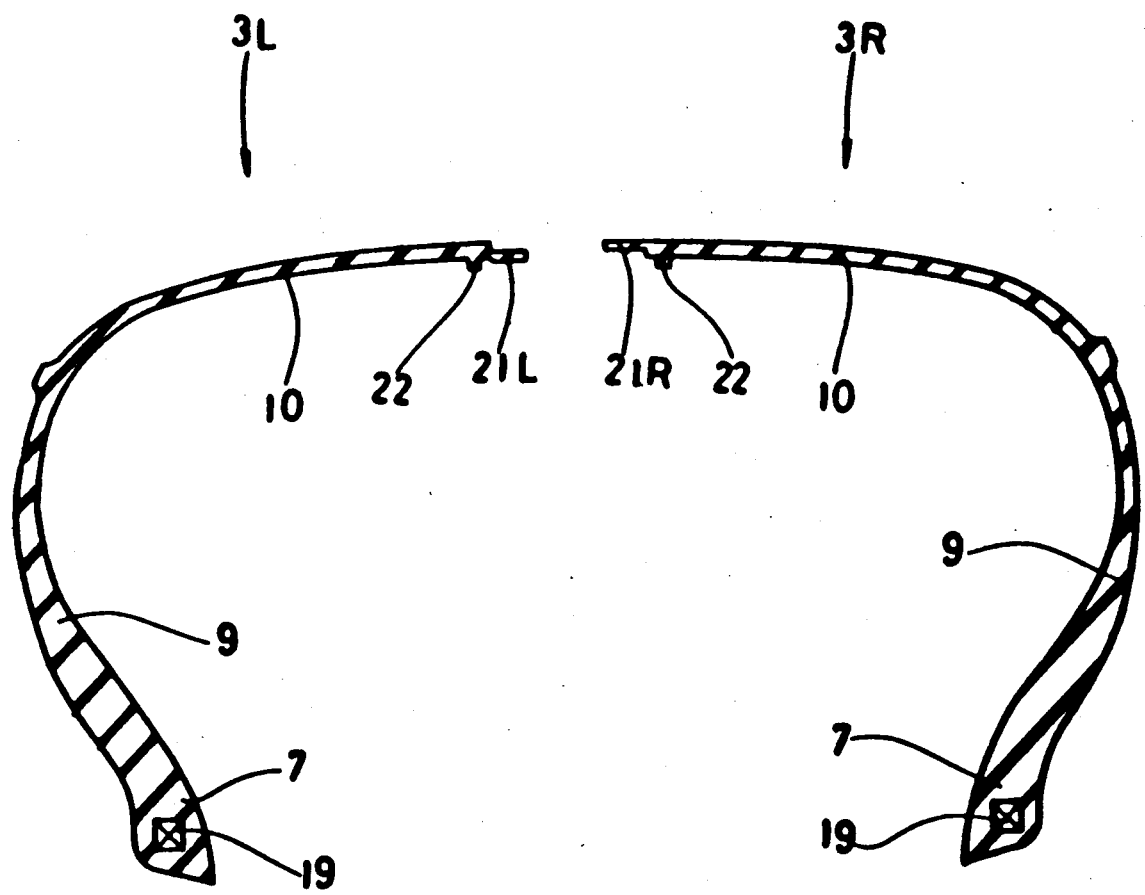
FIG. 2 is a sectional view showing a pair of circular half body members of making the tire main body thereof.

Here, as shown in FIG. 2, each circular half body member (3L, 3R) has a thin jointer (21L, 21R) at the axially inner edge of the tread base 10, and a circumferentially extending small rib 22 on the radially inner side of the axially inner edge portion of the tread base.

In one of the circular half body members 3R, the joiner 21R thereof has the radially outer surface flush with that of the tread base, and the thickness TR of the joiner 21R is larger than 50% of the thickness TB of the tread base, and further, the width WR of the joiner 21R in the axial direction of the tire is in a range of about 10 to 20 mm.

In the other circular half body member 3L, the thickness TL of the joiner 21L is larger than 50% of the thickness TB of the tread base similarly to the circular half body member 3R, and the width WL of the joiner 21L in the axial direction is set to be the same as the width WR, but unsimilarly to the circular half body member 3R, the radially outer surface of the joiner 21L is located radially inward of that of the tread base 10.

Figure 3:
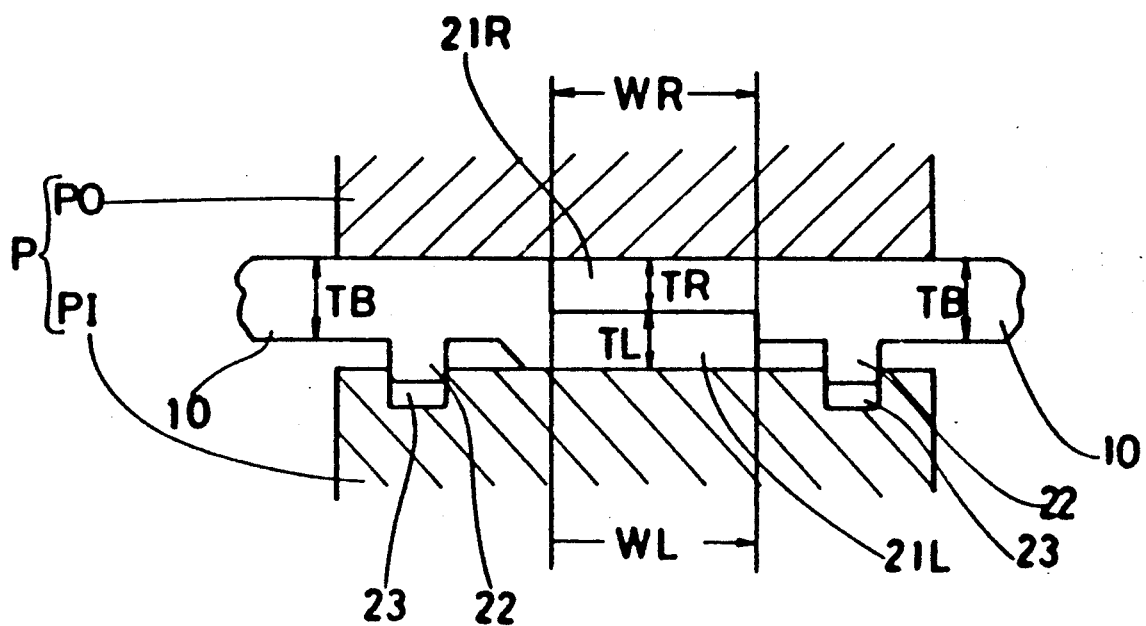
FIGS. 3 and 4 are enlarged sectional views showing a process for connecting the circular half body members with each other into one body to form the tire main body.
Figure 4:
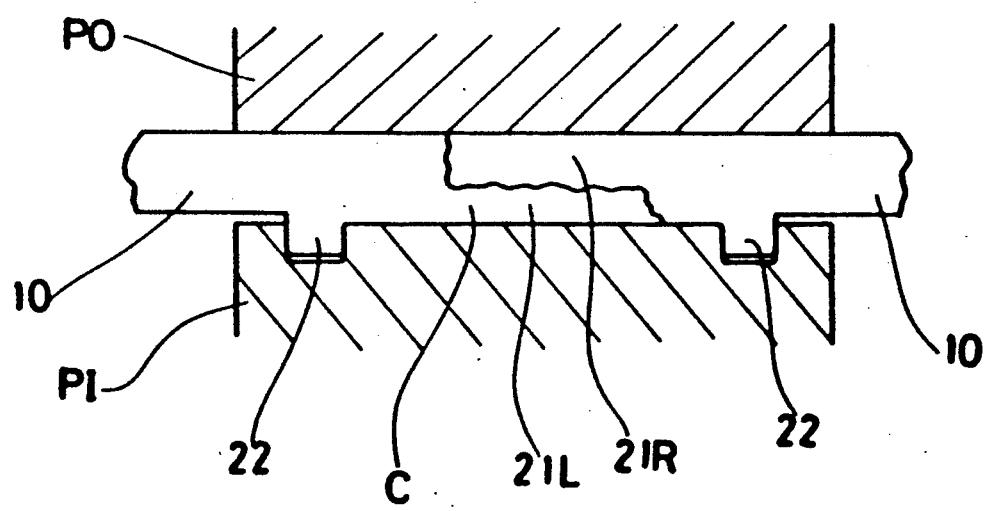

In the process (b), as shown in FIGS. 3 and 4, the joiners 21R and 21L are shiplapped or overlapped in such a way that the joiner 21R is disposed on the radially outside of the jointer 21L, and then they are welded by using a joining mold P to unite the circular half body members 3L and 3R to each other to form the tire main body 2.

That is, the circular half body members 3L and 3R are held opposite to each other as above described, and preassembled by overlapping the joiners, one upon the other, in the radial direction. Then, an inner mold member P1 and an outer mold member PO of the joining mold P are set radially inside and outside the overlap, respectively, that is, the overlap is interposed between the inner and outer mold members. The overlap is heated to melt or soften mainly the joiners 21L and 21R while, at the same time, pressed by the mold members to fuse the boundary thereof.

Figure 5:
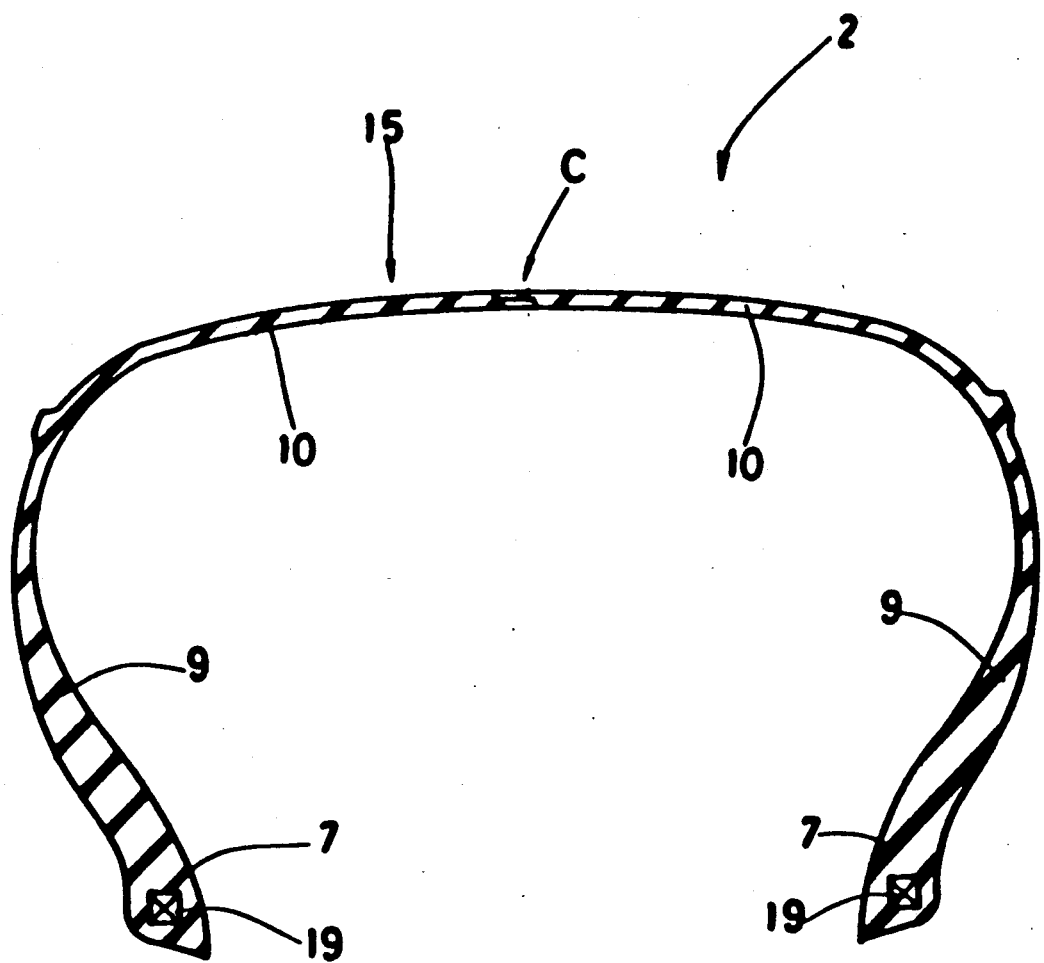
FIG. 5 is a sectional view showing the tire main body.

FIG. 5 shows the joined circular half body members 3R and 3L, that is, the tire main body 2. The inner mold member P1 is provided with a pair of circumferentially extending and axially spaced grooves 23 to fit the above-mentioned ribs 22 of the tread bases 10 respectively in the preassembled condition, whereby lateral movements of the tread bases can be effectively prevented. Heating of the overlap portions of the two halves 3R and 3L can be made by heating the joining mold P, by high-frequency heating, and the like.

Normally, the strength at the joined parts is apt to become lower. Therefore, to prevent such strength reduction, the above-mentioned thickness TL and TR are set to be larger than 50% of the thickness TB of the tread base 10, whereby the joined parts or the thickness TB of the tread base C becomes slightly thicker than both side main part, and the strength thereof is maintained at the same level or improved.

The ribs 22 may be formed on the radially outer surface of the tread base 10, and in this case the grooves 23 are formed on the outer mold member PO.

As is apparent from the above explanation, according to the process step (b), the tire main body is formed by welding a pair of molded circular half body members. Accordingly, there is such advantage that simple and precise mass production becomes possible.

Figure 6:
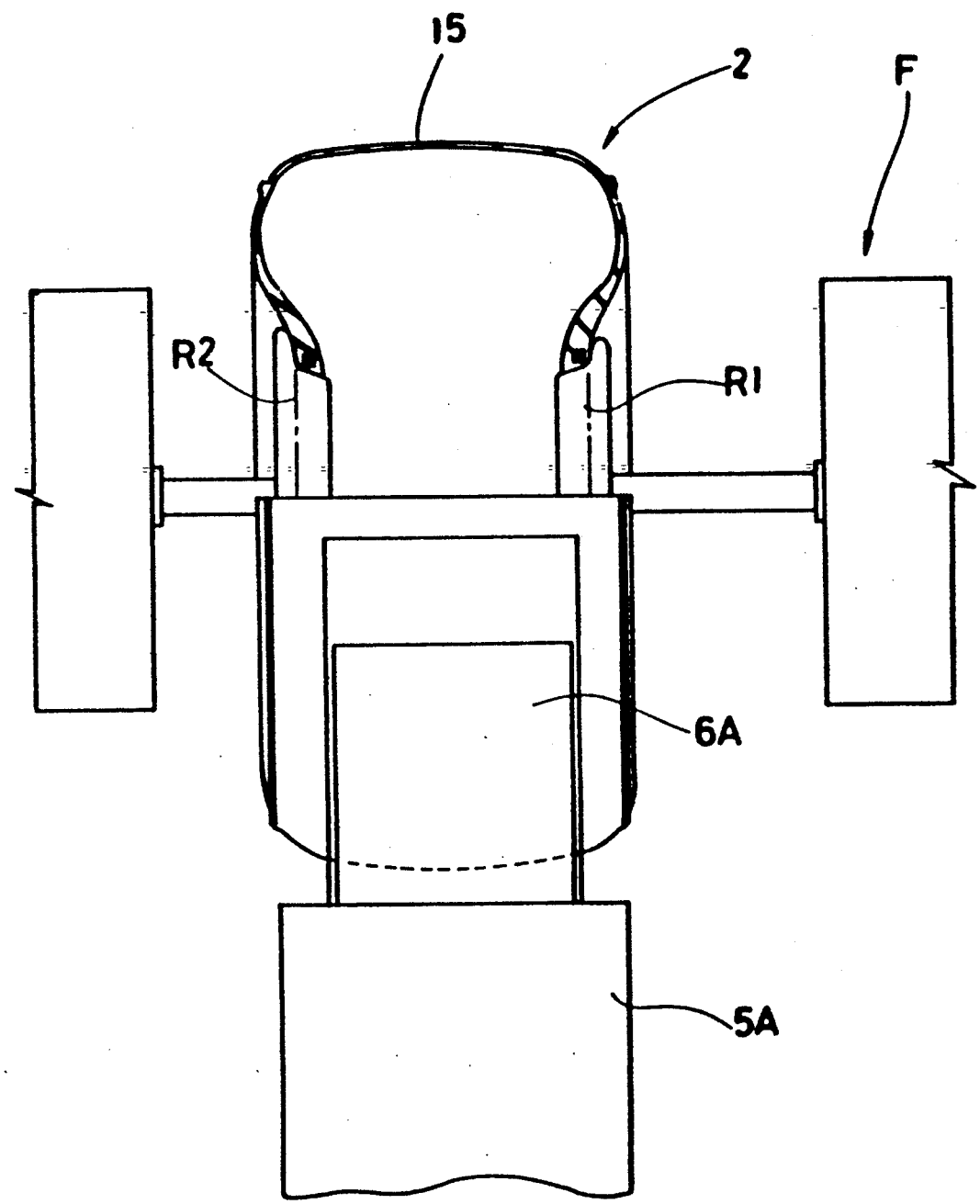
FIG. 6 is a schematic view showing the process of applying a raw, uncured breaker and a raw, uncured tread to the tire main body to provide a raw, uncured cover tire.
Figure 7:
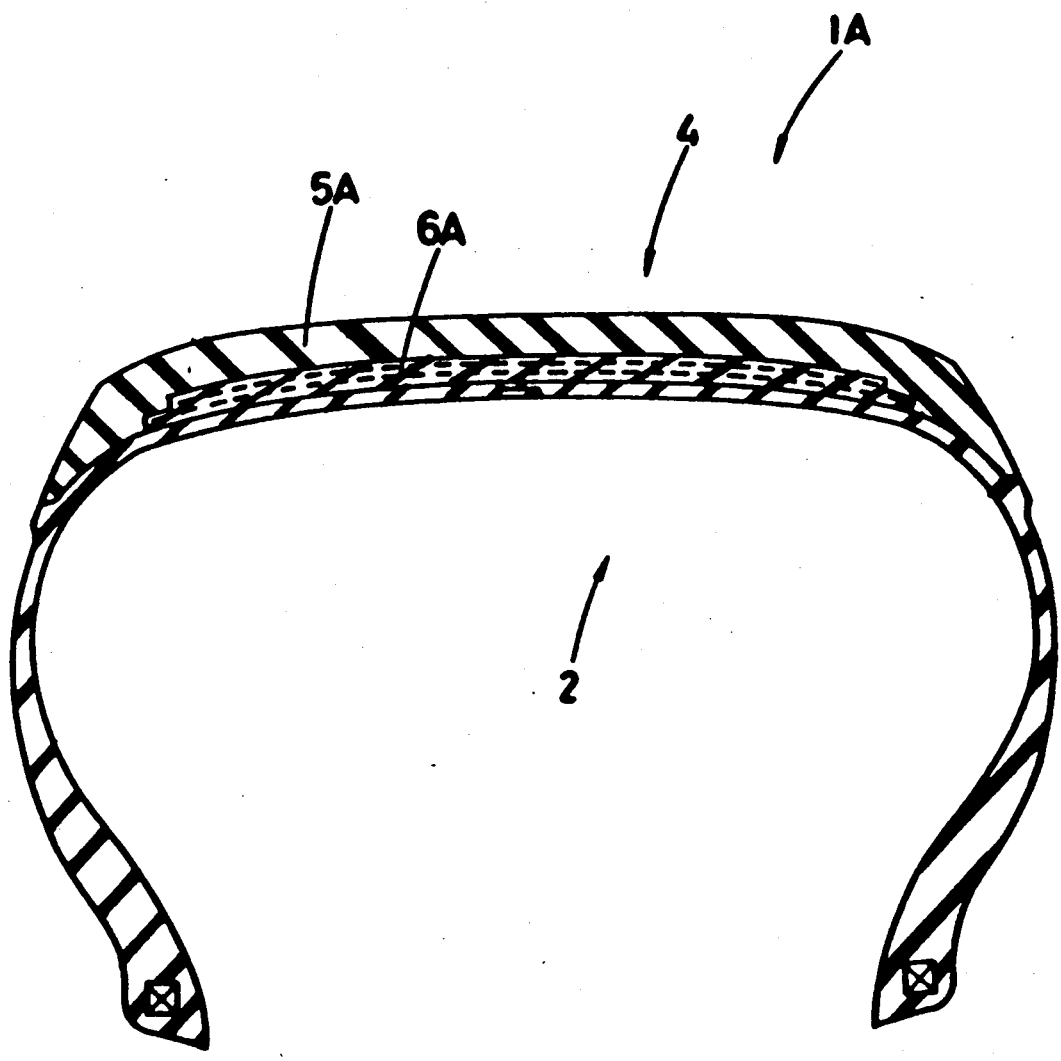
FIG. 7 is a sectional view showing the assembled raw, uncured cover tire.

In the above-mentioned process (c), as shown in FIG. 6, the tire main body 2 is supported between a pair of bead holding rings R1 and R2 of a tire former F, and the outer surface of the tread base 15 is buffed and cleaned up. Then an adhesive agent is applied to the buffed and cleaned up tread base surface, and when the adhesive agent is well dried, the uncured breaker 6A and the uncured tread 5A are bonded around the tire main body, by which a raw, uncured cover tire 1A is formed.

For the above-mentioned tire former F, such a one as used in the above-explained conventional method of making the conventional radial tire, can be used.

The uncured tread 5A is an uncured rubber band extruded from a tread extruder and cooled by cooling water and then cut into a specified length with a tread skiver similarly to a conventional way. The breaker 6A is formed by the same way as a conventional way.

A rubber compound applied to the tread 5A and the breaker 6a as the coating rubber thereof is the same as a conventional one, but it may by modified so as to increase the resulting bonding strength to the high polymer used in the tire main body 2.

As above described, in the process step (c), there is the advantage that conventional equipment can be used.

In the above-mentioned process step (d), the raw cover tire 1A is placed in a mold and heated and pressed, whereby the uncured tread and the uncured breaker together with the coating rubber thereof are cured, and the boundary between the tire main body 2 and the tread main body 4 is fused and these components are incorporated in one body, and at the same time the tread is provided with tread grooves G on the tread surface T.

This process step (d) also has the advantage that conventional equipment can be used similar to process step (c).

Accordingly, in the above-mentioned tire making method, the circular half body members can be made at high precision and low cost in mass production by molding the higher polymer, and the tire main body can be formed by joining the circular half body members. Thus, the process becomes remarkably simple and the process steps fewer in number in comparison with the conventional method of making a conventional radial tire. Furthermore, in the process after the tire main body is formed, conventional equipment can be used. Therefore, the cost of preparing newly required equipment becomes a minimum.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of manufacturing a pneumatic tire comprising a tire main body and a tread main body disposed therearound, said method comprising the steps of:

forming a pair of circular half body members from a pull resistant high polymer material, wherein each of said circular half body members comprises a bead portion, a sidewall portion extending radially outwardly from said bead portion, and a tread base portion extending axially inwardly from said sidewall portion, each of said tread base portions being provided at its axially innermost edge with a thin narrow joiner connecting member;

connecting said circular half body members to each other to form said tire main body by overlapping said respective joiner connecting members of each of said tread base portions of said respective circular half body members to provide a combined single tread base;

pressing said overlapped joiner members of said tread base portions together, each of said tread base portions being provided with a circumferentially extending rib on at least one of a radially inner side and outer side of said respective tread base portion for engaging with corresponding circumferentially extending grooves of a pressing tool to fit said ribs during the pressing step, whereby lateral movement of said tread base portions is prevented;

heating said overlapped joiner members of said tread base portions;

applying a tread main body to an outer periphery of said single tread base formed from said connected tread base portions of said half body members to form a raw cover tire, said tread main body including an uncured rubber tread and an uncured breaker;

placing said raw cover tire into a vulcanizing mold; and vulcanizing said raw cover tire in said mold to unite said tread main body and said tire main body by the heat of vulcanization.

2. The method according to claim 1, wherein said pull resistant high polymer material is a polyester elastomer.

* * * * *